(12) United States Patent
Seon

(10) Patent No.: US 6,731,907 B1
(45) Date of Patent: May 4, 2004

(54) CALL RESTRICTION METHOD FOR BASE STATION IN CELLULAR RADIO COMMUNICATION SYSTEM

(75) Inventor: Yong-Moon Seon, Songnam-shi (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 09/564,161

(22) Filed: May 3, 2000

(30) Foreign Application Priority Data

May 3, 1999 (KR) .......................................... 1999-15909

(51) Int. Cl.$^7$ .............................................. H04B 17/00
(52) U.S. Cl. ................................ 455/67.11; 455/67.13; 455/67.14
(58) Field of Search ................................ 455/522, 561, 455/572, 69, 70, 67.11, 438, 67.13, 67.14; 370/318

(56) References Cited

U.S. PATENT DOCUMENTS

| | | | | |
|---|---|---|---|---|
| 5,241,685 A | * | 8/1993 | Bodin et al. | 455/453 |
| 5,455,967 A | * | 10/1995 | Amezawa et al. | 455/69 |
| 5,590,409 A | * | 12/1996 | Sawahashi et al. | 455/69 |
| 5,649,290 A | * | 7/1997 | Wang | 370/332 |
| 5,912,884 A | * | 6/1999 | Park et al. | 370/331 |
| 5,960,330 A | * | 9/1999 | Azuma | 455/70 |
| 6,069,871 A | * | 5/2000 | Sharma et al. | 370/209 |
| 6,101,179 A | * | 8/2000 | Soliman | 370/342 |
| 6,487,191 B1 | * | 11/2002 | Kang et al. | 370/342 |
| 6,510,321 B2 | * | 1/2003 | Ritzen et al. | 455/450 |

FOREIGN PATENT DOCUMENTS

CN 1135151 A 11/1996 ............ H04Q/7/22

* cited by examiner

Primary Examiner—Vivian Chin
Assistant Examiner—Yuwen Pan
(74) Attorney, Agent, or Firm—Cha & Reiter, L.L.C.

(57) ABSTRACT

A method for restricting a reverse call in a base station is disclosed. The method comprising the steps of: calculating the noise power of the base station; measuring the total receiving power of the base station; calculating a cell loading factor of the base station using a ratio of the noise power to the total receiving power; comparing the calculated cell loading factor of the base station with a threshold predetermined for call restriction, and restricting a call incoming to the base station according to the comparison result.

18 Claims, 4 Drawing Sheets

CALL RESTRICTION METHOD FOR BASE STATION IN CELLULAR RADIO COMMUNICATION SYSTEM

CLAIM OF PRIORITY

This application makes reference to and claims priority and all benefits accruing under 35 U.S.C. Section 119 to an application entitled, "Call Restriction Method for Base Station in Cellular Radio Communication System," filed in the Korean Industrial Property Office on May 3, 1999 and there duly assigned Ser. No. 99-15909.

BACKGROUND OF THE INVENTION

1. Field of the Invention

The present invention relates generally to a cellular radio communication system, and in particular, to a method for restricting the establishment of an additional reverse call setup or new links established to support hand-offs when the load of the cellular radio communication system exceeds a certain threshold value.

2. Description of the Related Art

A cellular radio communication system divides a whole service area into a plurality of base station areas known as "cells." The base stations are centrally controlled by a mobile switching center (MSC) so that a mobile station (MS) can maintain a call connection while traveling from one cell to another. The cellular radio communication system includes forward channels for transmitting signals from the base stations to the mobile stations, and reverse channels for transmitting signals from the mobile stations to the base stations.

FIG. 1 illustrates the structure of a general base station in a cellular radio communication system. As shown in FIG. 1, the reference numeral 100 denotes a base station. A receiving antenna 110 receives a radio frequency (RF) signal from a mobile station. An RF unit 120 amplifies the received RF signal and filters the amplified RF signal. A frequency down-converter 130 converts the RF signal to an intermediate frequency (IF) signal, and a demodulator 140 demodulates the converted IF signal. A base station control processor (BCP) 150 controls the RF unit 120, the frequency down-converter 130 and the demodulator 140.

The base station 100 allocates a traffic channel for each call in order to exchange voice and data signals. As the traffic channel transmits a voice message corresponding to each call, the output of all traffic channels in the base station is affected by the number of calls being processed by the corresponding base station.

The CDMA (Code Division Multiple Access) cellular radio communication system separates the channels using spreading codes to enhance the capacity. Accordingly, the CDMA base station attempts to serve all new call originations which can sometimes lead to compulsory dropped calls due to the lack of available channels for communication, i.e., hard blocking.

A soft blocking occurs due to the occurrence of an additional call in the system which is a function of cell loading. The loading of a cell corresponds to the ratio between the number of active users and the maximum number of users capable of being serviced within the cell. A call that is additionally set up when the base station has a higher cell loading rate is controlled by the base station control processor 150. Thus, a call which is set up and exceeds the capacity of the base station control processor 150 interferes with all the mobile stations in the service area of the base station 100. In addition, when there are so many calls that can not be supported by the base station 100, the RF unit 120 of the base station 100 becomes inoperable and the call connection during the service is dropped, or the call quality is degraded. Furthermore, the new call origination increase the interference of the mobile stations located in the service area of a given base station 100, thus degrading the quality of the call service provided to the subscribers within the base station 100.

As mentioned above, when the reverse link of the base station has an overload in the cellular radio communication system, the additional call setup increases will increase the interference of the mobile stations, thus degrading the call quality.

SUMMARY OF THE INVENTION

It is, therefore, an object of the present invention to provide a method for restricting additional call setups when a base station detects an overload of a reverse link using the noise power level and the receiving power of the base station.

To achieve the above object, there is provided a method for restricting a reverse call in a base station. The method includes the steps of: calculating the noise power of the base station; measuring the total receiving power of the base station; calculating a cell loading factor of the base station using a ratio of the noise power to the total receiving power; comparing the calculated cell loading factor of the base station with a threshold predetermined for call restriction; and, restricting an incoming call to the base station according to the comparison results.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENT

A preferred embodiment of the present invention will be described herein below with reference to the accompanying drawings. For the purpose of clarity, well-known functions or constructions are not described in detail as they would obscure the invention in unnecessary detail.

Figure 1:
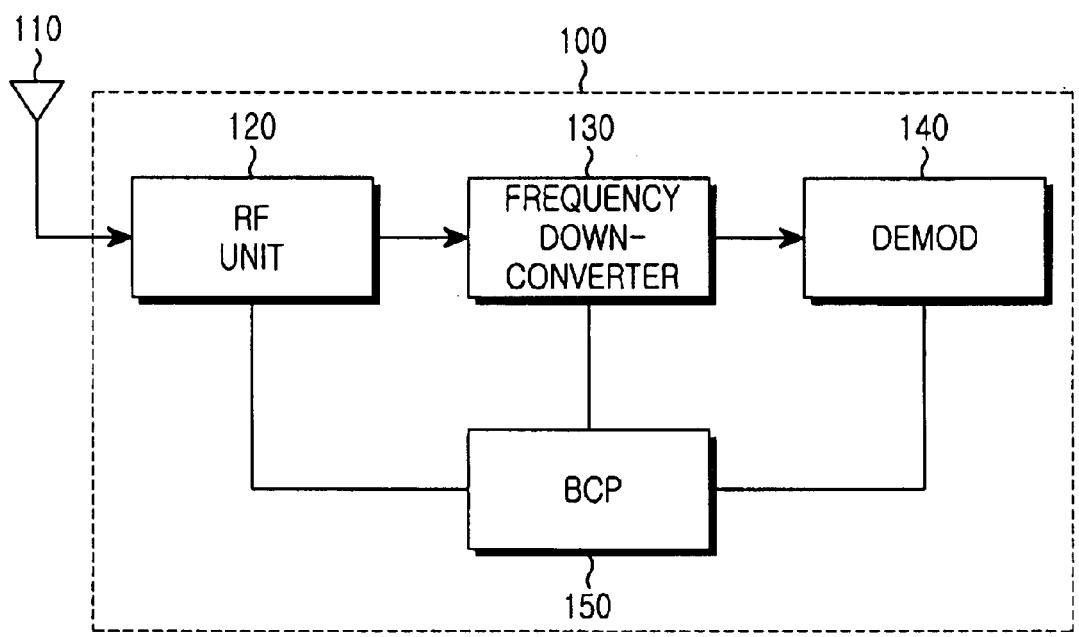
FIG. 1 is a diagram illustrating a general base station for a cellular radio communication system.
Figure 2:
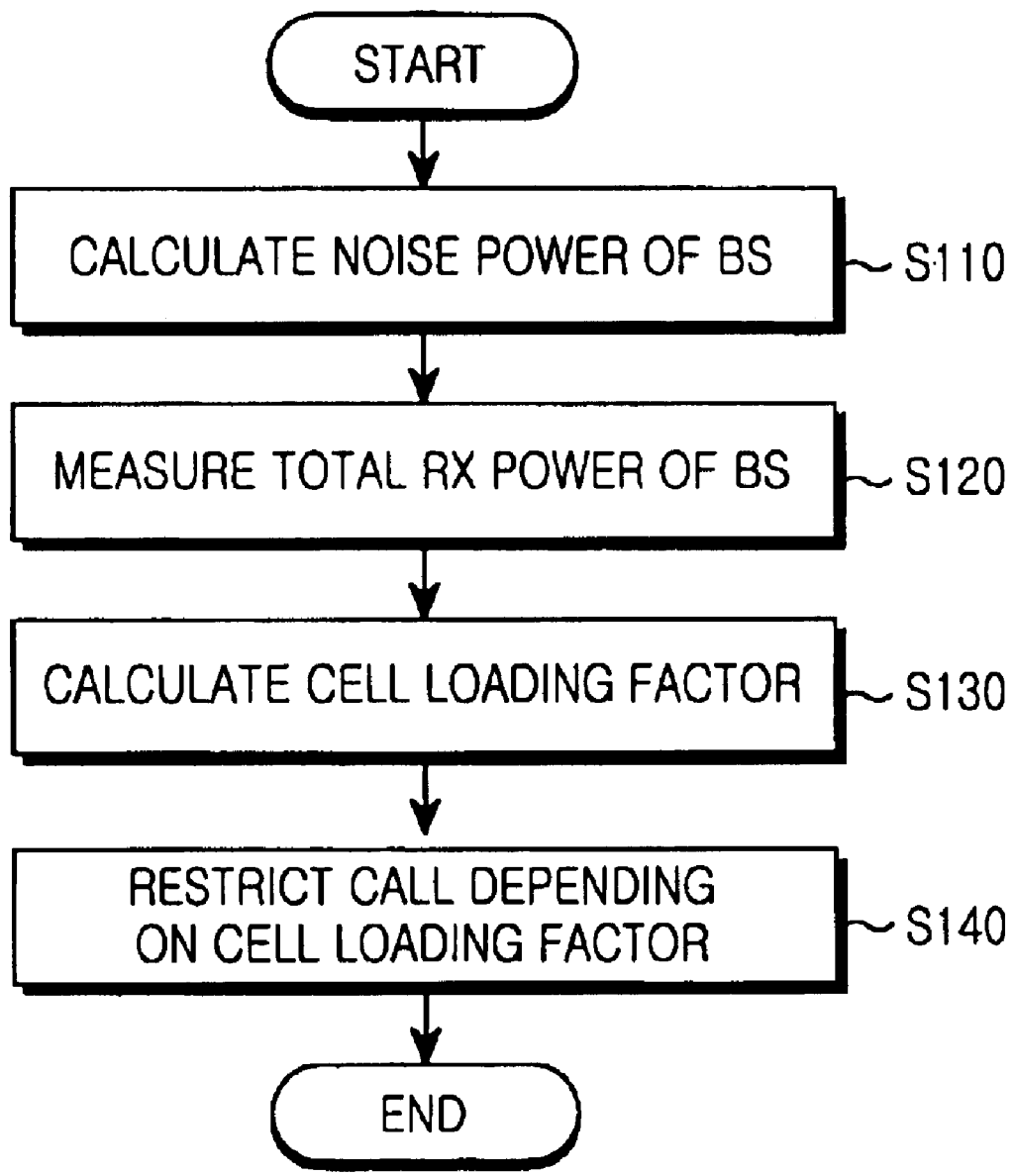
FIG. 2 is a flow chart illustrating the procedure for restricting a reverse call according to the embodiment of the present invention.
Figure 4:
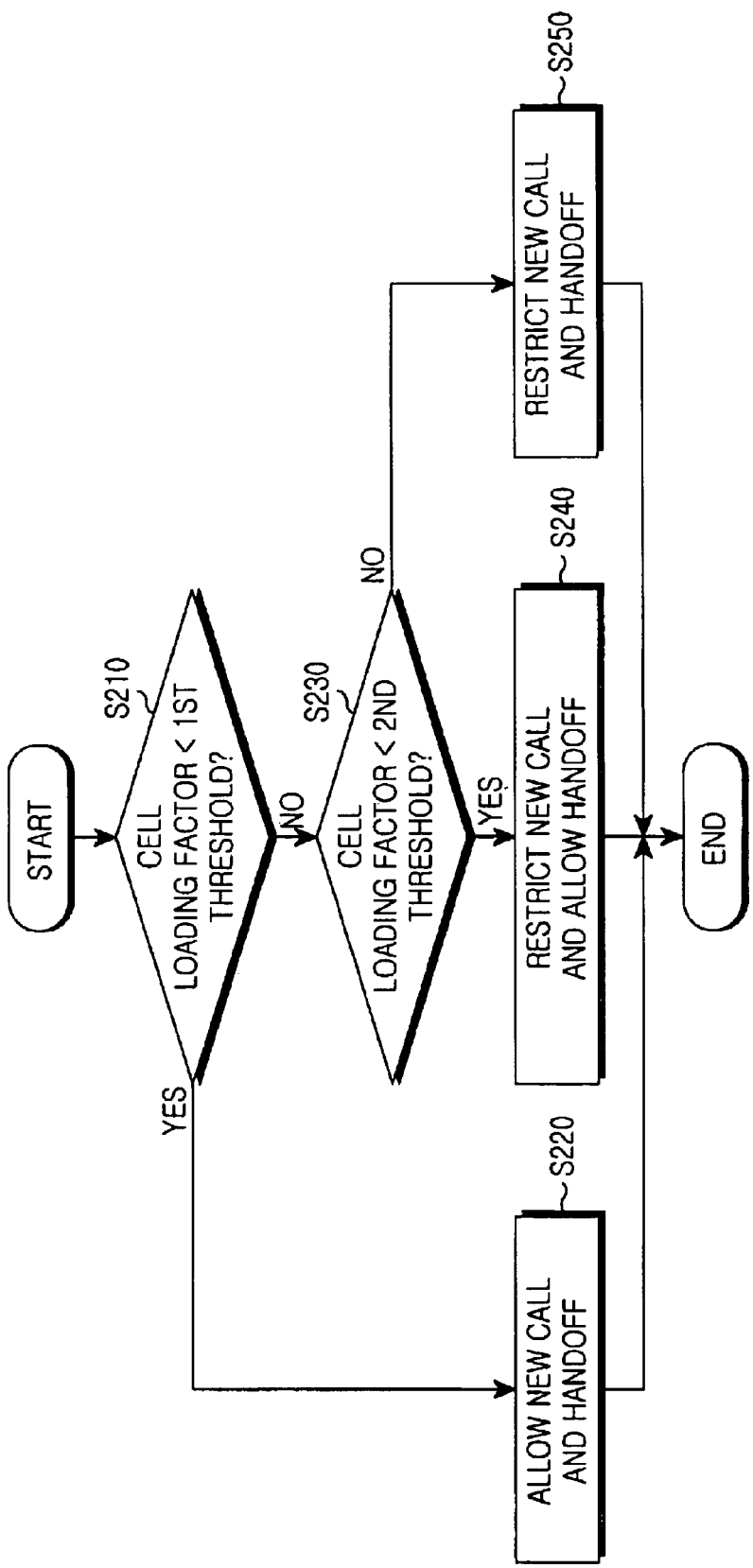

FIG. 2 illustrates a procedure for restricting a reverse call according to the embodiment of the present invention. FIG. 4 also illustrates a scheme for restricting a reverse call according to the embodiment of the present invention.

Figure 3:
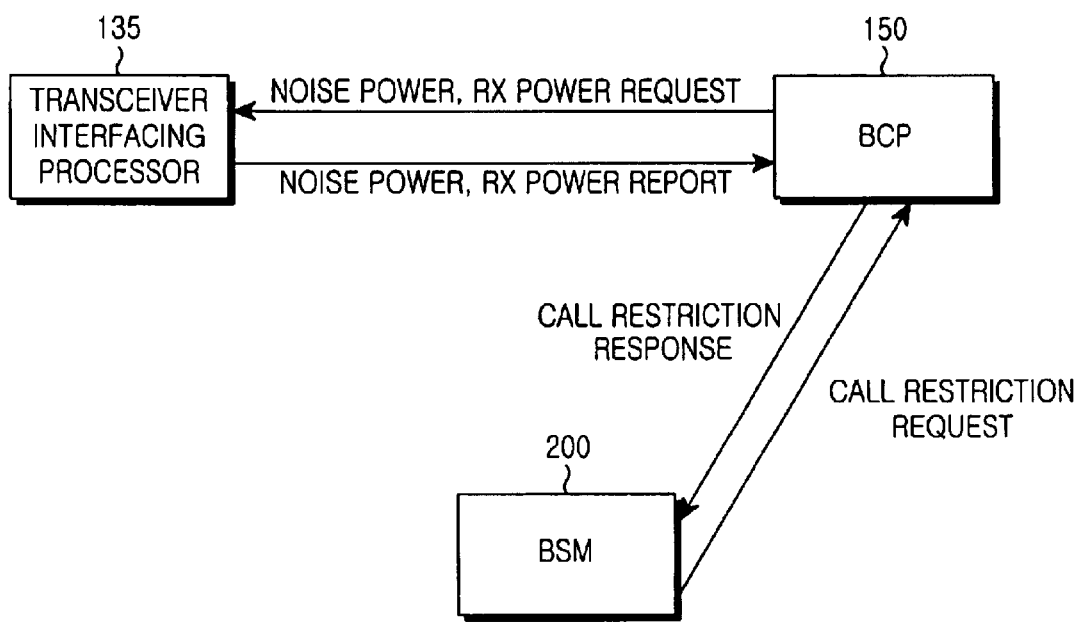
FIG. 3 is a block diagram illustrating the scheme for restricting a reverse call according to the embodiment of the present invention; and, FIG. 4 is a flow chart illustrating the procedure for restricting a forward call according to the embodiment of the present invention.

A discussion of the present invention will be made hereinafter with reference to FIGS. 2 and 3. As shown in FIG. 3, an operator can remotely control a plurality of base stations (BS) using a base station manager (BSM) 200. To this end, the operator sends a reverse call restriction request to the base station control processor (BCP) 150 using the base station manager (BSM) 200 to restrict (or block) a reverse call.

In general, a base station supports a plurality of frequency channels, and the service area of the base station is divided into a plurality of sectors, each sector corresponding to its associated frequency channel which is defined as a sub-cell. For example, when the base station supports two frequency channels and the service area of the base station is divided into three sectors, the base station includes 6 (=2×3) sub-cells. The base station independently processes the call in each sub-cell, and the load of each sub-cell is also independent from each other. Accordingly, the base station manager 200 can transmit the reverse call restriction request to control each sub-cell unit on a one-to-one basis.

Upon receipt of the reverse call restriction request from the base station manager 200, the base station control processor (BCP) 150 calculates the received noise power of the base station in step s110 (FIG. 2). In calculating the noise power of the base station, the present invention employs two different methods—the first method is used when a receiving attenuation value is set in the base station and the second method is used when the receiving attenuation value is not set in the base station.

The reason for applying different methods for calculating the noise power of the base station is as follows. In order to adjust the reverse service area of the base station, the base station attenuates the level of a received reverse signal. An increase in the attenuation value of a variable attenuator causes a decrease in the reverse service area of the base station. Yet, a decrease in the attenuation value of the variable attenuator causes an increase in the reverse service area of the base station. To this end, the base station includes the variable attenuator in the frequency down-converter 130. Thus, the two different methods are implemented to adapt to two different working environment. That is, the noise power of the base station should be separately calculated in the event that the receiving attenuation value is set in the base station and also in the event that the receiving value is not set in the base station.

I. First Method for Calculating the Noise Power of the Base Station (S110 of FIG. 2)

When the receiving attenuation value is set in the base station, the base station manager 200 defines two types of blossoms for the base station: a full blossom and a partial blossom. The full blossom refers to a state where the receiving attenuation value of the base station is set such that the reverse service area of the base station should be maximum. The partial blossom refers to a state where the receiving attenuation value of the base station is set such that the reverse service area of the base station should be slightly smaller than that of the full blossom. The full blossom and the partial blossom are determined by the base station manager (BSM) 200 such that the service area of each base station should have an optimal call environment by considering the service area of the adjacent base stations and the whole cell plan. When there is no call for a predetermined time, the receiving attenuation value and the receiving power should be considered for the full blossom and the partial blossom, respectively, in order to calculate the noise power received at the base station.

I.a. Full Blossom

To calculate the noise power of the base station, the base station control processor (BCP) 150 measures the receiving attenuation value $A_{i,full}$ and the receiving power $P_{i,full}$ for the full blossom. Herein, "i" refers to a receiving path of the base station. Commonly, the base station uses two receiving antennas to obtain the receiving diversity. Therefore, the base station control processor 150 measures the receiving attenuation value and the receiving power for the two receiving paths corresponding to the two receiving antennas. To this end, the base station control processor 150 sends a full blossom request to a transceiver interfacing processor 135. Upon receipt of the full blossom request, the transceiver interfacing processor 135 sends a response to the base station control processor 150 and then decreases the receiving attenuation value step by step, to minimize the influence on the adjacent base stations and to transition to the full blossom state.

In the full blossom state, the transceiver interfacing processor 135 reports the set receiving attenuation value $A_{i,full}$ to the base station control processor 150. Upon receipt of the receiving attenuation value, the base station control processor 150 orders the transceiver interfacing processor 135 to repeatedly measure the receiving power of the base station at specific times.

In response to the order from the base station control processor 150, the transceiver interfacing processor 135 repeatedly measures the receiving power of the base station at given times, and reports the measured receiving power values to the base station controller 150. At this point, if a new call is originated in the base station or if there are imbalances in cell loading, non-reciprocal propagation, equipment imbalances, and other environment conditions which affects the measured results, the base station control processor 150 rejects the measured results and issues a re-measurement order When there occurs no factor which affects the measured results in the receiving power of the signal received at the base station, the base station control processor 150 calculates an average, $P_{i,full}$, of the receiving power values. Herein, $P_{i,full}$ is the receiving power of the base station for full blossom.

I.b. Partial Blossom

In addition, the base station control processor 150 measures the receiving attenuation value $A_{i,part}$ and the receiving power $P_{i,part}$ for the partial blossom. Similar to the full blossom, the base station control processor 150 measures the receiving attenuation value and the receiving power for the two receiving paths corresponding to the two receiving antennas. To this end, the base station control processor 150 sends a partial blossom request to the transceiver interfacing processor 135. Upon receipt of the partial blossom request, the transceiver interfacing processor 135 sends a response to the base station control processor 150 and then increases the receiving attenuation value step by step, to minimize the influence on the adjacent base stations and to transition to the partial blossom state.

In the partial blossom state, the transceiver interfacing processor 135 reports the set receiving attenuation value $A_{i,part}$ to the base station control processor 150. Upon receipt of the receiving attenuation value, the base station control processor 150 orders the transceiver interfacing processor 135 to repeatedly measure the receiving power of the base station at specific times.

In response to the order from the base station control processor 150, the transceiver interfacing processor 135 repeatedly measures the receiving power of the base station given times, and reports the measured receiving power values to the base station controller 150. At this point, if a new call is originated in the base station or if there are imbalances in cell loading, non-reciprocal propagation, equipment imbalances, and other environment conditions which affects the measured results, the base station control processor 150 rejects the measured results and issues a re-measurement order.

When there occurs no factor which affects the measured results, the base station control processor (BCP) 150 calculates an average, $P_{i,part}$, of the receiving power values. Herein, the $P_{i,part}$ represents the receiving power of the base station for the partial blossom.

After calculating the receiving attenuation values and the receiving power for the full blossom and the partial blossom, the noise power of the base station is calculated using the obtained results.

First, the receiving power $N_{i,front}$ measured before the receiving attenuation value is set at the base station is defined as:

$$N_{i,front} = \frac{A_{i,full} \times P_{i,part} - A_{i,part} \times P_{i,full}}{A_{i,full} - A_{i,part}}. \quad (1)$$

In addition, the receiving power $N_{i,inject}$ measured after the receiving attenuation value is set at the base station is defined as:

$$N_{i,inject} = \frac{P_{i,full} - P_{i,part}}{A_{i,full} - A_{i,part}}. \quad (2)$$

From Equations (1) and (2), the noise power $N_i$ of the signal received at the base station while there is no call, is defined as:

$$N_i = N_{i,front} + A_{i,inject} \times N_{i,inject} \quad (3),$$

where $A_{i,inject}$ denotes a receiving attenuation value set in a receiving path "i" of the base station. The average of the noise power values $N_i$, measured at the respective paths, is equal to the noise power $N_{T1}$ of the base station for the case where the receiving attenuation value is set in the base station.

Through the process stated above, the noise power $N_{T1}$ of the base station is calculated for the case where the receiving attenuation value is set in the base station. However, when the receiving attenuation value is not set in the base station, it is not necessary to separately calculate the noise power of the base station.

II. Second Method for Calculating the Noise Power of the Base Station (S110 of FIG. 2)

When there is no call for a predetermined time in the base station, the base station control processor 150 orders the transceiver interfacing processor 135 to repeatedly measure the receiving power of the base station at specific times. In response to the order from the base station control processor 150, the transceiver interfacing processor 135 repeatedly measures the receiving power of the base station at given times, and reports the measured receiving power values to the base station controller 150. At this point, if a new call is originated in the base station or if there are imbalances in cell loading, non-reciprocal propagation, equipment imbalances, and other environment conditions which affects the measured results, the base station control processor 150 rejects the measured results and issues a re-measurement order.

When there occurs no factor which affects the measured results, the base station control processor 150 calculates an average, $N_{T2}$, of the receiving power values. Herein, $N_{T2}$ represents the noise power of the base station measured when the receiving attenuation value is not set in the base station.

As illustrated in FIG. 2, after calculating the noise power of the base station in step s110, the base station control processor 150 periodically measures the total receiving power of the base station in step s120. However, the total receiving power of the base station should also be separately calculated for the case where the receiving attenuation value is set in the base station and for the case where the receiving attenuation value is not set in the base station.

III. First Method for Calculating the Total Receiving Power of the Base Station (S120 of FIG. 2)

A description will be made herein relating to a method for measuring the total receiving power of the base station for the case where the receiving attenuation value is set in the base station. The transceiver interfacing processor 135 periodically reports the receiving power, i.e., the received signal strength indicator (RSSI) of the base station, without request from the base station control processor (BCP) 150. When the receiving power of the base station reported by the transceiver interfacing processor 135 is $P_{RSSI}$, the total receiving power $P_{RX1}$ of the base station for the case where the receiving attenuation value is set in the base station, is defined as:

$$P_{RX1} = A_{i,inject} + A_i + P_{RSSI} \quad (4),$$

where $A_i$ denotes a loss generated in the receiving path of the base station.

IV. Second Method for Calculating the Total Receiving Power of the Base Station (S120 of FIG. 2)

When the receiving attenuation value is not set in the base station, the total receiving power $P_{RX2}$ of the base station is equal to the measured receiving power $P_{RSSI}$. Therefore, the base station control processor (BCP) 150 regards the receiving power $P_{RSSI}$ reported by the transceiver interfacing processor 135, as the total receiving power $P_{RX2}$.

After measuring the total receiving power of the base station, the base station control processor 150 periodically calculates a cell loading factor using the noise power of the base station and the measured total receiving power of the base station, in step s130. That is, the base station control processor 150 calculates the cell loading factor whenever a new total receiving power of the base station is measured.

Here, the cell loading factor is defined as:

$$\text{Cell Loading Factor} = 1 - \frac{N_T}{P_{RX}}. \quad (5)$$

In Equation (5), when the receiving attenuation value is set in the base station, $N_T = N_{T1}$ and $P_{RX} = P_{RX1}$. Otherwise, when the receiving attenuation value is not set in the base station, $N_T = N_{T2}$ and $P_{RX} = P_{RX2}$.

After calculating the cell loading factor, the base station control processor 150 compares the calculated cell loading factor with a predetermined threshold value to restrict a call, in step s140. Here, as a call incoming to the base station is divided into a new call and a handoff call, the call restriction method should also be divided.

The new call includes an origination call to the base station, requested by the mobile station located in the service area of the base station, or a termination call to the base station, requested by the mobile switching center. However, the handoff call includes a call incoming to the base station when the mobile station in communication with another base station enters the service area of the base station.

As for the subscriber, it is more important to maintain the present call connection rather than to succeed in connecting a new call. Therefore, the base station sets a different threshold value for restricting the new call and the handoff call, thus separately restricting the two types of calls.

Since the handoff call is more important than the new call, the threshold for the restriction of handoff call should be higher than the threshold for the restriction of a new call. In addition, the threshold for the restriction of handoff calls can also be applied to an emergency call.

FIG. 4 shows the procedure for restricting a forward call according to the embodiment of the present invention. As described with reference to FIG. 2, after calculating the cell loading factor of the base station, the base station control processor 150 determines, in step s210, whether the cell loading factor of the base station is lower than a first call restriction threshold value. When the cell loading factor of the base station is lower than the first call restriction threshold, the base station control processor 150 allows all calls incoming to the base station, i.e., the new call, the handoff call, and the emergency call, in step s220.

Otherwise, if the cell loading factor of the base station is equal to or higher than the first call restriction threshold, the base station control processor 150 determines, in step s230, whether the cell loading factor of the base station is lower than a second call restriction threshold. When the cell loading factor of the base station is lower than the second call restriction threshold, the base station control processor 150 blocks only the new call incoming to the base station, and allows the handoff call and the emergency call, in step s240. Otherwise, when the cell loading factor of the base station is equal to or higher than the second call restriction threshold, the base station control processor 150 blocks all new calls, handoff calls, and emergency calls incoming to the base station, in step s250.

As described above, the novel method restricts a reverse call using a cell loading factor of the base station. The method accurately measures the noise power and the receiving power of the base station in order to calculate an accurate cell loading factor. Therefore, it is possible to detect the overload of the base station to prevent the unacceptable degradation of voice quality and to protect the RF units of the base station.

While the invention has been shown and described with reference to a certain preferred embodiment thereof, it will be understood by those skilled in the art that various changes in form and detail may be made therein without departing from the spirit and the scope of the invention as defined by the appended claims. The corresponding structures, materials, acts and the equivalents of all means or step-plus-function elements in the claims below are intended to include any structure, material, or act for performing the functions in combination with other claimed elements/methods as specifically claimed.

What is claimed is:

1. A method for restricting a reverse call in a baste station, comprising the steps of:
   (a) calculating a noise power of the base station;
   (b) measuring a total receiving power of the base station;
   (c) calculating a cell loading factor of the base station using a ratio of the noise power to the total receiving power;
   (d) comparing the calculated cell loading factor of the base station with a predetermined threshold for call restriction; and,
   (e) restricting an incoming call to the base station according to the comparison result; wherein step (a) of calculating the noise power of the base station comprises the sub-steps of:
      (i) measuring the receiving power of the base station when there is no call for a predetermined time in the base station; and
      (ii) determining the measured receiving power of the base station as the noise power of the base station; and
   wherein the step (a) of calculating the noise power comprises the sub-steps of:
      (1) measuring a receiving attenuation value $A_{i,full}$ and a receiving power $P_{i,full}$ of the base station in a full blossom state so that the reverse service area of the base station becomes maximum;
      (2) measuring a receiving attenuation value $A_{i,part}$ and a receiving power $P_{i,part}$ of the base station in a partial blossom state so that the reverse service area of the base station is substantially less than that the full blossom state; and,
      (3) calculating the noise power of the base station using the receiving attenuation value and the receiving power of the base station measured in the full blossom state in step (1) and the partial blossom state in step (2).

2. The method as claimed in claim 1, wherein the step (1) of measuring the receiving attenuation value and the receiving power of the base station in the full blossom state comprises the steps of:
   ordering a transceiver interfacing processor (TIP) of the base station to enter the full blossom state;
   in response to the order to enter the full state, decreasing the receiving attenuation value in the transceiver interfacing processor (TIP) at an increment to minimize an interference with an adjacent base station, and entering the full blossom state to receive a final attenuation value;
   upon receiving the final attenuation value, ordering the transceiver interfacing processor (TIP) to repeatedly measure the receiving power of the base station at specified times;
   receiving the measured receiving power values of the base station from the transceiver interfacing processor (TIP); and,
   calculating an average of the received receiving power values of the base station.

3. The method as claimed in claim 2, wherein the step (1) of measuring the receiving attenuation value and the receiving power of the base station in the full blossom state further comprising the steps of:
   rejecting the measured receiving attenuation value and the receiving power of the base station and providing the transceiver interfacing processor (TIP) with a re-measurement order if a new call is generated in the base station or if the measured receiving power of the base station is changed after setting the receiving attenuation value in the base station.

4. The method as claimed in claim 3, wherein the receiving attenuation value and the receiving power of the base station measured in the full blossom state are defined by the following equation:

$$N_i = N_{i,front} + A_{i,inject} \times N_{i,inject},$$

wherein the $N_i$ represents the noise power of the base station for an i-th receiving path; the $N_{i,front}$ represents the receiving power of a signal received at the base station before the receiving attenuation value is set at the base station; the $N_{i,inject}$ represents the receiving power of the signal received at the base station after the receiving attenuation value is set at the base station; and, the $A_{i,inject}$ represents the receiving attenuation value set in an i-th receiving path of the base station; and,
wherein an average ($N_{T1}$) of the noise power calculated in all receiving path for the noise power ($N_i$) of the i-th receiving path of the base station is determined as the noise power of the base station.

5. The method as claimed in claim 4, wherein the receiving power $N_{i,front}$ of the signal received at the base station before the receiving attenuation value is set at the base station is defined as the following equation:

$$N_{i,front} = \frac{A_{i,full} \times P_{i,part} - A_{i,part} \times P_{i,full}}{A_{i,full} - A_{i,part}},$$

wherein the $A_{i,full}$ represents the receiving attenuation value and the $P_{i,full}$ represents the receiving power of the base station in a full blossom state; and, wherein the $A_{i,part}$ represents the receiving attenuation value and the $P_{i,part}$ represents the receiving power $P_{i,part}$ of the base station in a partial blossom state.

6. The method as claimed in claim 5, wherein the receiving power $N_{i,inject}$ of the signal received at the base station after the receiving attenuation value is set at the base station is defined as the following equation:

$$N_{i,inject} = \frac{P_{i,full} - P_{i,part}}{A_{i,full} - A_{i,part}}$$

wherein the $A_{i,full}$ represents the receiving attenuation value and the $P_{i,full}$ represents the receiving power of the base station in a full blossom state; and, wherein the $A_{i,part}$ represents the receiving attenuation value and the $P_{i,part}$ represents the receiving power $P_{i,part}$ of the base station in a partial blossom state.

7. The method as claimed in claim 6, wherein the total receiving power of the base station is defined as:

$$P_{RX1} = A_{i,inject} + A_i + P_{RSSI},$$

wherein the $P_{RX1}$ represents the total receiving power of the base station; the $A_{i,inject}$ represents the receiving attenuation value set in an i-th receiving path of the base station; the $A_i$ represents a loss generated in the receiving path of the base station; and, the $P_{RSSI}$ represents the receiving power of the base station.

8. The method as claimed in claim 1, wherein the step (2) of measuring the receiving attenuation value and the receiving power of the base station in the partial blossom state comprises the steps of:

ordering a transceiver interfacing processor (TIP) of the base station to enter the partial blossom state;

in response to the order to enter the partial blossom state, increasing the receiving attenuation value in the transceiver interfacing processor (TIP) at an increment to minimize interference with an adjacent base station, and entering the partial blossom state to receive a final attenuation value;

upon receiving the final attenuation value, ordering the transceiver interfacing processor (TIP) to repeatedly measure the receiving power of the base station at specified times;

receiving the measured receiving power values of the base station from the transceiver interfacing processor (TIP); and, calculating an average of the received receiving power values of the base station.

9. The method as claimed in claim 8, wherein the step of measuring the receiving attenuation value and the receiving power of the base station in the partial blossom state further comprising the steps of:

rejecting the measured receiving attenuation value and the receiving power of the base station and providing the transceiver interfacing processor (TIP) with a re-measurement order if a new call is generated in the base station or if the measured receiving power of the base station is changed after setting the receiving attenuation value in the base station.

10. The method as claimed in claim 1, wherein the step (1) of calculating the noise power of the base station comprises the steps of:

ordering the transceiver interfacing processor to repeatedly measure the receiving power of the base station at specified times if there is no call for a predetermined time in the base station;

receiving the receiving power values from the transceiver interfacing processor (TIP); and, calculating an average of the receiving power values received from the transceiver interfacing processor (TIP).

11. The method as claimed in claim 10, wherein the step (1) of calculating the noise power of the base station further comprising the steps of:

rejecting the measured receiving attenuation value and the receiving power of the base station and providing the transceiver interfacing processor (TIP) with a re-measurement order if a new call is generated in the base station or if the measured receiving power of the base station is changed after setting the receiving attenuation value in the base station.

12. The method as claimed in claim 11, wherein the receiving power of the base station received when a call is incoming to the base station is determined as the total receiving power of the base station.

13. The method as claimed in claim 11, wherein the cell loading factor of the base station is defined as:

$$\text{Cell Loading Factor} = 1 - \frac{N_T}{P_{RX}},$$

wherein the $N_T$ represents the noise power of the base station, and the $P_{RX}$ represents the total receiving power of the base station.

14. The method as claimed in claim 13, wherein the step (e) of restricting an incoming call to the base station comprises the steps of:

(1) determining whether the cell loading factor of the base station is lower than a first threshold value;

(1) (i) if the cell loading factor of the base station is lower than the first threshold value, allowing both a new call and a handoff call; then, (1) (ii) if the cell loading factor of the base station is not lower than the first threshold; and, (2) determining whether the cell loading factor of the base station is lower than a second threshold value;

(2)(i) if the cell loading factor of the base station is lower than the second threshold value, allowing the handoff call and restricting the new call; and, (2)(ii) if the cell loading factor of the base station is equal to or greater than the second threshold value, restricting both the new call and the handoff call.

15. The method as claimed in claim 14, the reverse call restriction is performed on a sub-cell unit basis.

16. A method for restricting a reverse call in a base station, comprising the steps of:

(a) calculating a noise power of the base station;

(b) measuring a total receiving power of the base station;

(c) calculating a cell loading factor of the base station using a ratio of the noise power to the total receiving power;

(d) comparing the calculated cell loading factor of the base station with a predetermined threshold for call restriction; and, (e) restricting an incoming call to the base station according to the comparison result; wherein the cell loading factor of the base station is defined as:

$$\text{Cell Loading Factor} = 1 - \frac{N_T}{P_{RX}},$$

wherein the $N_T$ represents the noise power of the base station, and the $P_{RX}$ represents the total receiving power of the base station.

17. The method as claimed in claim 16, wherein the step (e) of restricting an incoming call to the base station comprises the steps of:

(1) determining whether the cell loading factor of the base station is lower than a first threshold value;

(1) (i) if the cell loading factor of the base station is lower than the first threshold value, allowing both a new call and a handoff call; then, (1) (ii) if the cell loading factor of the base station is not lower than the first threshold; and, (2) determining whether the cell loading factor of the base station is lower than a second threshold value;

(2)(i) if the cell loading factor of the base station is lower than the second threshold value, allowing the handoff call and restricting the new call; and, (2) (ii) if the cell loading factor of the base station is equal to or greater than the second threshold value, restricting both the new call and the handoff call.

18. The method as claimed in claim 17, the reverse call restriction is performed on a sub-cell unit basis.

* * * * *